(12) United States Patent
Siali et al.

(10) Patent No.: US 7,022,775 B2
(45) Date of Patent: Apr. 4, 2006

(54) RESINS BASED ON POLYSTYRENE-FUNCTIONALIZED METHYL ESTERS GROUPS OF L-TYROSINE AND THEIR USES

(75) Inventors: Rosa Siali, Saint-Denis (FR); Hamid Lakhiari, Bondy (FR); Catherine Boisson-Vidal, Paris (FR); Jacqueline Jozefonvicz, Lamorlaye (FR)

(73) Assignee: Bioracs, Morges (CH)

( * ) Notice: Subject to any disclaimer, the term of this patent is extended or adjusted under 35 U.S.C. 154(b) by 316 days.

(21) Appl. No.: 10/415,775

(22) PCT Filed: Nov. 6, 2001

(86) PCT No.: PCT/FR01/03419

§ 371 (c)(1),
(2), (4) Date: May 27, 2003

(87) PCT Pub. No.: WO02/38616

PCT Pub. Date: May 16, 2002

(65) Prior Publication Data

US 2004/0132918 A1     Jul. 8, 2004

(30) Foreign Application Priority Data

Nov. 13, 2000 (FR) .................................. 00 14542

(51) Int. Cl.
*C08F 112/08* (2006.01)
*C08F 212/08* (2006.01)

(52) U.S. Cl. .................................. 525/333.3; 525/333.9

(58) Field of Classification Search ............. 525/333.3, 525/333.9

See application file for complete search history.

(56) References Cited

U.S. PATENT DOCUMENTS 4,419,245 A * 12/1983 Barrett et al. ................ 210/681
4,736,019 A *  4/1988 Bellattar et al. .......... 530/389.3

FOREIGN PATENT DOCUMENTS

| DE | 26 35 930 A1 | 3/1977 |
| DE | 43 42 154 A1 | 6/1995 |
| EP | 0 130 898 A1 | 1/1985 |
| EP | 0 161 468 A2 | 11/1985 |
| EP | 0 203 865 A1 | 12/1986 |
| EP | 0 304 377 A2 | 2/1989 |

* cited by examiner

*Primary Examiner*—Robert D. Harlan
(74) *Attorney, Agent, or Firm*—Alston & Bird LLP

(57) ABSTRACT

The present invention relates to resins based on functionalized polystyrene, to the method for the production thereof, to the use thereof for producing columns for purifying anti-factor VIII antibodies, and also to a method for purifying anti-factor VIII antibodies ex vivo.

21 Claims, No Drawings

RESINS BASED ON POLYSTYRENE-FUNCTIONALIZED METHYL ESTERS GROUPS OF L-TYROSINE AND THEIR USES

The present invention relates to resins based on functionalized polystyrene, to the method for the production thereof, to the use thereof for producing columns for adsorbing anti-factor VIII antibodies, and also to a method for purifying anti-factor VIII antibodies ex vivo.

Hemophilia A is due to an abnormality of the gene which synthesizes one of the blood-clotting factors, namely factor VIII. This disease is distributed throughout the world with the same frequency and affects one individual per 5 000 births.

Hemophilia A is a very serious hemorrhagic disease which, in the absence of treatment, leads to death after a more or less brief period of time.

Factor VIII (FVIII) is one of the essential factors involved in the blood-clotting process (hemostasis). Factor VIII is a labile glycoprotein, the normal concentration of which in the plasma is very low (50–100 ng/ml), (M. Verstraete et al., Advanc. Contracep., 1991, 7, 244–258).

Current treatments, which are purely substitutive, make it possible to introduce this clotting factor which is in deficit or nonexistent, into the blood circulation, by means of intravenous infusion, this being in order to reestablish normal hemostasis.

A complication of this substitutive treatment is the appearance, in 25 to 30% of cases of severe hemophilia, of alloantibodies directed against the biological activity of FVIII, neutralizing this activity (Y. Sultan, Gazette Medicale de France, 1978, 85, 1017–1026; L. M. Aledort, Hemophilia, 1998, 4, 341–345 and J. Cabane, Le Concours Medical, 1987, 109, 139–142).

When this complication appears, the substitutive treatment by introducing the FVIII which is in deficit becomes ineffective, and it is then necessary to use other methods for treating hemophiliacs thus immunized.

One of the possible means for helping immunized hemophiliacs and also individuals who develop autoantibodies (anti-FVIII antibodies associated in particular with autoimmune diseases) is to purify the blood plasma of these antibodies.

These antibodies are immunoglobulins G (IgGs) synthesized by the B lymphocytes of the immune system and belonging mainly to $IgG_4$s, with sometimes $IgG_1$s and $IgG_2$s.

This purification of the plasma of anti-FVIII antibodies is generally carried out by passing the plasma to be purified through a column containing an immunoadsorbent, by means of extracorporeal circulation.

The columns used to perform this operation may be composed of an agarose gel (Sepharose®) to which anti-human IgG antibodies may be attached.

Thus, it has already been proposed, for example, in particular by V. Regnault et al., Tromb. Res., 1987, 45, 51–57, to covalently attach anti-human $IgG_4$ antibodies from goats to a Sepharose® gel. With such a support, it appears to be possible to remove 58 to 94% of the anti-FVIII antibodies present in the plasma of hemophiliacs; however, this support does not make it possible to remove all the anti-FVIII antibodies given that some of them belong to the $IgG_1$ subclass.

Still with the same aim, it has also been proposed to couple protein A extracted from *Staphylococcus aureus* to a Sepharose® gel (H. Lee et al., Thromb. Res., 1979, 14, 925–930). Protein A reacts with the Fc fragment of the IgGs of various species (H. Hjelm et al., Febs. Lett., 1972, 28, 73–76). In humans, it recognizes the Fc fragment of $IgG_1$s, $IgG_2$s and $IgG_4$s.

Its properties make this protein a good ligand for purifying total IgGs and, for this reason, it has been used for a long time in the purification of many antibodies.

However, the purification of plasma using columns composed of protein A bound to a Sepharose® gel is not specific for anti-FVIII antibodies and leads not only to a 90% decrease in the plasma level of total IgGs, but also of that of IgAs and of IgMs, thus considerably weakening the immune defenses of the patient in whom the purification of the plasma was carried out. In addition, this support exhibits insufficient stability which may, when it is used, lead to gradual desorption of the protein A. This protein A is then entrained into the blood circulation of the patient undergoing the purification of the plasma, which causes harmful activation of the complement system.

This technique is extremely expensive given the cost price of this type of column and does not protect against possible viral contamination via the protein A.

More recently, a method for separating anti-FVIII antibodies using adsorption columns consisting of supports based on polymers (cellulose polyesters, cellulose polyethers, polystyrene (PS), polyisoprene or polybutadiene) functionalized with sulfonate and chlorosulfonyl functions carrying amino acid residues such as, for example, glutamic acid, hydroxyproline, threonine, alanine or phenylalanine, has also been proposed, in particular in patent application FR-A-2 582 815.

In this way, in the article by C. Boisson-Vidal et al., J. Mat. Sc., 1991, 2, 193–196, resins based on polystyrene, substituted at 18, 24 or 65% with the dimethyl ester of glutamic acid, or at 8, 16 or 35% with α-hydroxyproline, are proposed. The best results were obtained with the resin consisting of the polystyrene modified at 24% with the dimethyl ester of glutamic acid.

However, such supports are not always satisfactory from the point of view of their insufficient specificity of adsorption with respect to the anti-FVIII antibodies and of their yield from purification with respect to anti-FVIII antibodies, which is too low.

The article by L. Dahri et al., J. Biomater. Sci. Edn., 1994, 8, 695–705, describes adsorption resins based on polystyrene substituted to various degrees with L-tyrosine or with the methyl ester of L-tyrosine (approximately from 5 to 55%).

However, the specificity of these resins is not satisfactory either, since the use thereof also leads to the removal from the plasma of more than 25% of clotting factor V (FV), the presence of which is essential to the correct functioning of the clotting process. In addition, the presence of impurities (chlorine) has been demonstrated.

It is in order to remedy these problems that, surprisingly, the inventors have developed what forms the subject of the invention.

They have in fact developed a novel method for preparing (synthesizing, conditioning) resins made of functionalized polystyrene containing from 5 to 15% of sulfamide functions derived from the methyl ester of L-tyrosine. These resins are capable of specifically adsorbing anti-FVIII antibodies, thus allowing them to be used as immunoadsorbents for producing columns for extracorporeal purification in individuals having developed these antibodies.

A subject of the present invention is therefore resins made of polystyrene crosslinked at 2–5% and functionalized with sulfonate groups and sulfamide groups derived from the methyl ester of L-tyrosine, characterized in that they correspond to the following formula (I):

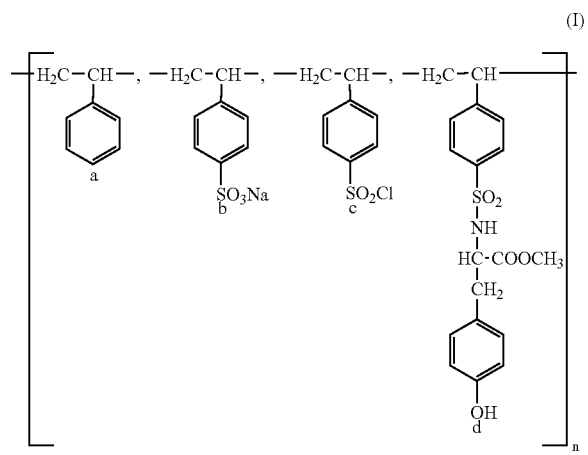

in which:
- a is between 5 and 15%;
- b is between 74 and 82%;
- c is between 0 and 5%; and
- d is between 5 and 15%;
- n is between 3 and 5 000;
- the sum of a+b+c+d being equal to 100.

In the following description, and for reasons of convenience, the resins of formula (I) in accordance with the invention may be named PTyrOMe (or BIOTYR).

The resins of formula (I) in which the index c is between 0 and 2% are preferred, and even more particularly, those in which the index c is equal to 0% are preferred.

According to the invention, the index d is preferably between 7 and 13%.

According to a preferred embodiment of the invention, the polystyrene is crosslinked with divinylbenzene. As indicated above, the degree of crosslinking of the polystyrene is between 2 and 5%. In fact, the use of polystyrene exhibiting a degree of crosslinking of less than 2% (of the order of 1%) results in unstable resins. The use of polystyrene exhibiting a degree of crosslinking of more than 5% results in resins which are difficult to functionalize.

The resins of formula (I) are generally in the form of beads with a diameter of preferably between approximately 35 and 800 µm in the dry state, and even more preferentially between 35 and 75 µm.

The resins of formula (I) may be used for producing chromatography columns, in particular for producing columns for purifying plasma and blood. These columns are capable of adsorbing anti-FVIII antibodies.

A subject of the invention is therefore also purification columns containing at least one resin of formula (I) as defined above, and equilibrated in buffer at a physiological pH of generally between approximately 7.3 and 7.4.

These columns may be part of a device for purifying anti-FVIII antibodies, consisting of a closed circuit with continuous circulation, in which one or more purification columns as defined above may be installed, said columns being positioned in series or in parallel, so as to increase the anti-FVIII antibody purification yield while at the same time possibly decreasing the purification time.

These purification circuits are preferably equipped with an injection valve and with a pump which provides the circulation. When this purification device is used to treat blood samples, then it may also be equipped with a cell separator which separates the plasma from the cellular elements constituting the blood, before this plasma is passed over the column in accordance with the invention.

The purification circuit is preferably maintained at a temperature equal or close to 37° C. throughout the duration of the purification.

A subject of the present invention is therefore also the use of one or more resins of formula (I) as defined above, for producing columns intended to treat liquids containing anti-FVIII antibodies. The liquids to be treated are preferably plasmas or total blood, and even more particularly plasmas and total blood from patients suffering from hemophilia A.

The inventors have in fact demonstrated that the purification of plasmas from individuals suffering from hemophilia A using plasma purification devices comprising at least one column containing at least one resin of formula (I) in accordance with the invention makes it possible to remove the majority of the anti-FVIII antibodies present in said plasmas.

In addition, after this purification the level of residual total IgGs in the plasma and that of the clotting factors varies within very small proportions, thus demonstrating the very great specificity of the resins of formula (I) with respect to the adsorption of anti-FVIII antibodies.

Another advantage of this plasma purification device is that the passing of the plasma over the purification column in accordance with the invention does not lead to any significant decomplementation of this plasma by adsorption of the proteins of the complement system.

According to the use in accordance with the invention, and when the purification is finished, the purification columns comprising at least one resin of formula (I) as defined above can be regenerated by desorption of the plasma fraction adsorbed onto the resin, by passing a saline solution, in general a 3M NaCl solution, over the columns. The resin is then reequilibrated using a buffer solution at physiological pH (between approximately 7.3 and 7.4). According to a particular embodiment of the invention, and when the purification circuit is equipped with at least two purification columns in accordance with the invention arranged in parallel, one of them is regenerated while the other is used for adsorbing the anti-FVIII antibodies.

The regeneration of these purification columns does not lead to a chemical degradation of the resin of formula (I), the consequence and advantage of which is that the specificity thereof with respect to anti-FVIII antibodies is not modified.

A subject of the invention is also a method for preparing the resins made of functionalized polystyrene of formula (1).

The resins of formula (I) are prepared in two main steps: chlorosulfonation which makes it possible to introduce chlorosulfonyl functions onto the aromatic rings of the polystyrene, and then attachment of the methyl ester of L-tyrosine via the chlorosulfonyl groups.

According to this method, and in a first step, a chlorosulfonation reaction is carried out, consisting in reacting monochlorosulfonic acid ($HSO_3Cl$) (in excess) on beads of nonfunctionalized polystyrene (PS) crosslinked at 2–5%, in an $HSO_3Cl/PS$ molar ratio of greater than 8, so as to obtain a polystyrene carrying para-chlorosulfonic functions ($PSSO_2Cl$), and then, a second step consists in esterifying the para-chlorosulfonic functions ($SO_2Cl$) of the polystyrene $PSSO_2Cl$ thus obtained, with the methyl ester of L-tyrosine (TyrOMe) in the form of hydrochloride dissolved beforehand in an organic solvent medium in the presence of a tertiary amine, the TyrOMe/SO$_2$Cl molar ratio (R) being between 0.1 and 1, the tertiary amine/TyrOMe molar ratio (R') being between 1 and 2 and the tertiary amine/SO$_2$Cl molar ratio (R") being between 1 and 2, so as to obtain a resin of formula (I) as defined above.

This method of synthesis can be represented, in a simplified manner, by the general scheme A below, in which the index d has the same meaning as that indicated above for the compounds for formula (I).

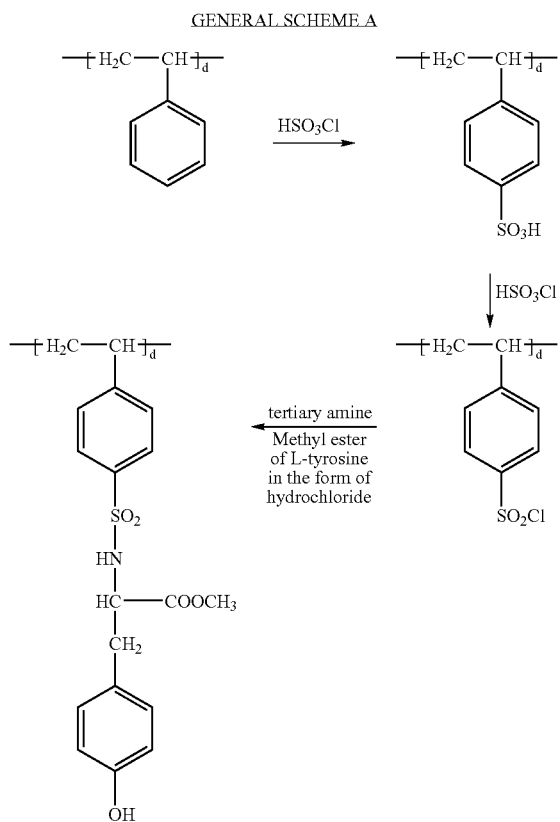

According to a preferred embodiment of this preparation method, the molar ratio (R) is equal to 0.15, the molar ratio (R') is equal to 2, and molar ratio (R") is equal to 1.

The beads of nonfunctionalized crosslinked polystyrene used during the first step are preferably beads of polystyrene crosslinked with divinylbenzene.

They are preferably swollen beforehand in a solvation medium for polystyrene, Such as dichloromethane, nitromethane, perchloroethylene, dimethylformamide, methylene chloride or tetrahydrofuran. Swelling the beads of polystyrene in the salvation medium makes it possible to increase the accessible surface area such that the reagent may completely penetrate the beads so as to have a large yield.

The chlorosulfonation reaction of the first step is preferably carried out after prior swelling of the PS in dichloromethane in two substeps: the chlorosulfonic acid reacts on the nonfunctionalized polystyrene and leads to the formation of an intermediate polymer, poly(sulfonic)styrene, and then to the formation of poly(para-chlorosulfonyl)styrene.

The chlorosulfonation reaction is preferably carried out at a temperature of between 30 and 60° C., and even more particularly at 40° C., for approximately 4 hours, this being with the aim of increasing the rate of the reaction, and with gentle stirring so as to avoid grinding of the beads of polystyrene. These conditions make it possible to obtain yields of the order of 70 to 90%.

At the end of the first step, the PSSO$_2$Cl resin is preferably washed, firstly, with dichloromethane in order to remove the excess acid and, secondly, with acetone in order to remove any traces of acid remaining in the medium and to facilitate drying of the resin.

In order to carry out the second step, the PSSO$_2$Cl beads are preferably dried under vacuum and then swollen in a solvation medium, such as those used in the first step and defined above, so as to increase the surface area accessible to the reagent used in the second step.

During this second step, the methyl ester of L-tyrosine is attached by condensation of the hydrochloride form of the latter to the PSSO$_2$Cl in an anhydrous solvent, in the presence of a tertiary amine such as, for example, triethylamine (NEt$_3$). The tertiary amine transforms the hydrochloride into free amine which then reacts with the chlorosulfonic polystyrene. Secondly, the amino acid solution is brought into contact with the PSSO$_2$Cl resin, which has preferably been swollen beforehand. The hydrochloric acid generated during the reaction is neutralized by adding a tertiary amine, such as NEt$_3$, to the reaction medium.

The determination of the amount of reagents (tertiary amine and hydrochloride of the methyl ester of L-tyrosine) to be used depends on the amount of SO$_2$Cl functions attached during the first step, which is determined by argentimetric assay and by elemental analysis.

This amount, expressed in milliequivalents per gram of resin (meq/g), serves as a basis for calculation in order to determine the amounts of reagent to be used.

In the first step, the chlorosulfonation yield is in general equal to at least 76%, i.e. between 4 and 5 meq of chlorine per gram of resin or between 4 and 5 mmol of SO$_2$Cl functions per gram of resin.

The amounts of methyl ester of L-tyrosine (TyrOMe) and of tertiary amine (AIII) to be used are calculated based on the following molar ratios:

R=TyrOMe/PSSO$_2$Cl=0.15;
R'=AIII/TyrOMe=2; and
R"=TyrOMe/PSSO$_2$Cl=1

When the synthesis has finished, the resin thus obtained is filtered, washed, preferably with an alcohol such as ethanol, and then dried under vacuum at a temperature of between 40 and 50° C.

When the synthesis has finished, it is also desirable to remove any trace of chlorine such that the index c of the resins of formula (I) is as low as possible, and preferably equal to 0%.

To do this, the resin is preferably washed with a basifying agent (such as sodium hydroxide) capable of hydrolyzing the residual para-chlorosulfonyl functions without saponifying the L-tyrosine methyl ester functions. After about ten washes, the residual chlorine level becomes negligible.

Before it is used, the resin is preferably conditioned by a succession of washes and of centrifugations in order to remove any trace of impurities which may interact with the plasma proteins.

To do this, the resin is given a series of washes using various types of solution: sodium chloride, sodium citrate, Michaelis buffer.

Between each of these washes, the resins are preferably thoroughly washed in double-distilled water.

After each step of synthesis, the resins of formula (I) in accordance with the invention are preferably subjected to a series of physicochemical characterizations.

In particular, microscopic observation of the resins makes it possible to obtain information regarding the form and size distribution of the particles before and after each step of the synthesis.

Determination of the degree of substitution of each resin may be carried out by elemental analysis of the elements constituting the resin: nitrogen, sulfur, chlorine and sodium.

The chlorine content of the resins may also be determined by argentimetric assay of the chloride ions released after hydrolysis of a sample of the resin in suspension in an aqueous sodium hydroxide solution.

The content of methyl ester of L-tyrosine (formula (I)—index d) may also be determined by acidimetric assay of the carboxylic function released by prehydrolysis of the ester function, for example with an aqueous sodium hydroxide solution.

The degree of substitution of methyl ester of L-tyrosine, obtained under the conditions under which the preparation method in accordance with the invention is carried out, varies between 5 and 15%, demonstrating the good reproducibility of this method of synthesis.

At the end of synthesis, the fine particles originating from possible breaking of the beads of polystyrene during the various steps of the synthesis are preferably eliminated. This elimination may be carried out by performing a series of successive washes and centrifugations on the resins in buffer solution, preferably at a pH of between 7.2 and 7.4. These washes are preferably carried out until the supernatant is completely clarified.

The absence of fine particles in the resin may be controlled using a biological test (thrombin time, activated partial thromboplastin time, etc.).

These biological tests are carried out in accordance with the specificities of the reagent manufacturers.

Just before their use, and when the resins of formula (I) have been introduced into the purification column(s), the latter are preferably equilibrated at physiological pH (in general 7.4) in a buffer such as Michaelis buffer, a phosphate buffer, Owen Coler buffer or veronal buffer.

Finally, a subject of the invention is a method for purifying the anti-FVIII antibodies present in a liquid, ex vivo, characterized in that it consists:

a) in bringing said liquid into contact with at least one purification Column containing at least one resin of formula (I) as defined above, and b) in then separating said liquid from said resin of formula (I) onto which the anti-FVIII antibodies have been adsorbed.

According to a preferred embodiment of this purification method, said liquid is blood plasma or total blood, and even more particularly blood plasma or total blood from patients suffering from hemophilia A.

Besides the arrangements above, the invention also comprises other arrangements which will emerge from the following description, which refers to examples of synthesis of functionalized resins of formula (I) according to the invention, to a comparative example of the adsorption of clotting factors onto a resin of formula (I) and a protein A—Sepharose® resin, to an example of demonstration of the specificity of adsorption of a resin of formula (I) with respect to anti-FVIII antibodies, to studies of the adsorption of clotting factors onto two columns containing at least one resin of formula (I) assembled in series or in parallel, and to an example of a study of the adsorption of a complement protein by a resin of formula (I).

It should be clearly understood, however, that these examples are given purely by way of illustration of the subject of the invention, in which they in no way constitute a limitation.

EXAMPLE 1

Preparation of a Resin of Formula (I) (BIOTYR 4)

1) Step Comprising Preparation for Synthesis 100 g of beads of polystyrene crosslinked at 3%, sold under the name Bio-Beads S-X3® (200–400 mesh) by the company Bio-Rad are suspended in 800 ml of $CH_2Cl_2$. The entire mixture is stirred gently for 1 hour at ambient temperature. The suspension is then filtered and washed with 800 ml of $CH_2Cl_2$. The resin is finally suspended in 400 ml of $CH_2Cl_2$.

2) Step Comprising Chlorosulfonation of the Polystyrene (Production of a $PSSO_2Cl$)

A mixture consisting of 650 ml of $CH_2Cl_2$ and 550 ml of $HSO_3Cl$ is poured very slowly over the resin in suspension in $CH_2Cl_2$. The entire mixture is brought to reflux at 40° C. with gentle stirring for 4 hours. The resin is then filtered and then washed 3 times with 1 liter of $CH_2Cl_2$. The washing of the resin is continued with 3 times 1 liter of acetone, and this resin is then filtered. Finally, the $PSSO_2Cl$ resin is recovered, weighed and dried under vacuum at 40° C.

3) Characterization of the $PSSO_2Cl$ resin

Samples of the $PSSO_2Cl$ resin obtained above in step 2) are taken in order to determine the chlorine content of this resin. This analysis is carried out by argentimetric assay, as follows: 100 g of $PSSO_2Cl$ resin are hydrolyzed using 75 ml of 2M sodium hydroxide solution. The mixture is maintained at reflux for 3 hours, with gentle stirring, at a temperature of between 90 and 100° C. The $PSSO_2Cl$ resin thus hydrolyzed is filtered and rinsed with distilled water. The filtrate is then acidified to a pH of between 3 and 4 by adding 1M nitric acid. The solution is then assayed with a 0.1M silver nitrate solution in order to determine the chlorine content. A microscopic analysis of the beads of $PSSO_2Cl$ and an elemental analysis are also carried out.

The $PSSO_2Cl$ resin exhibited the following characteristics:

| Methods | Results | | | | |
| --- | --- | --- | --- | --- | --- |
| Microscopic analysis | The beads exhibited a spherical shape and a heterogeneous size distribution in accordance with those of the beads of origin. | | | | |
| Argentometric assay | Chlorine (meq/l) 5.0 | | | % $SO_2Cl$ 77.6 | |
| Elemental analysis | Cl 4.0 meq/g | S 4.7 meq/g | PS 10% | $SO_3H$ 14% | $SO_2Cl$ 76% |

4) Step Comprising Attachment of the Methyl Ester of L-Tyrosine (Example of the BIOTYR 4 Resin 100 g of $PSSO_2Cl$ resin obtained above in step 2) are swollen in 500 ml of $CH_2Cl_2$ for 30 min at ambient temperature.

15 g of TyrOMe are dissolved in 1 liter of $CH_2Cl_2$ at 40° C. at reflux and by a gradual addition of 18 ml of $NEt_3$ over 1 hour.

The two mixtures are then combined. 60 ml of $NEt_3$ are then gently added to the mixture. The entire reaction medium is brought to reflux at 40° C. for 2 hours, with gentle stirring.

The resin is then filtered, and washed with 6 liters of ethanol and then with 15 liters of an aqueous $10^{-2}M$ sodium hydroxide solution.

Finally, the BIOTYR 4 resin is recovered, weighed and dried in an incubator under vacuum at 40° C.

5) Step Comprising Characterization of the Attachment of the Methyl Ester of L-Tyrosine 200 mg of BIOTYR 4 resin obtained above in step IV) are hydrolyzed with 100 ml of a 2M sodium hydroxide solution, at 50° C. for 24 hours. The resin is then filtered, washed with distilled water and dried in an incubator.

190 mg of BIOTYR 4 resin thus hydrolyzed are suspended in 70 ml of distilled water and assayed with a titrating solution of 0.1M sodium hydroxide on a titration stand. A microscopic analysis and an elemental analysis are also carried out.

The BIOTYR 4 resin exhibited the following characteristics:

| Methods | Results |
|---|---|
| Microscopic analysis | The beads exhibited a spherical shape and a heterogeneous size distribution in accordance with those of the beads of origin. |
| Acid-base assay | COOH (meq/g)   PS   $SO_3Na$   TyrOMe<br>4.8                  10%   81%         9% |
| Elemental analysis | Cl    N    S    PS    $PSSO_2Cl$    TyrOMe    $SO_3Na$<br>0.2  0.5  4.0  10%    0%              11%          79% |

EXAMPLE 2

Preparation of Resins of Formula (I)

In the same way as described above in example 1, the resins of formula (I) in accordance with the invention (BIOTYR 1 to BIOTYR 3 and BIOTYR 5 to BIOTYR 8) were prepared. The characteristics thereof appear in table I below:

TABLE I

| Resins | PS (%) | $SO_2Cl$ (%) | $SO_3Na$ (%) | TyrOMe (%) |
|---|---|---|---|---|
| BIOTYR 1 | 10 | 1 | 77 | 12 |
| BIOTYR 2 | 10 | 5 | 74 | 11 |
| BIOTYR 3 | 7.5 | 4 | 78.5 | 10 |
| BIOTYR 5 | 8 | 0 | 82 | 10 |
| BIOTYR 6 | 7.5 | 2 | 78 | 12.5 |
| BIOTYR 7 | 9 | 2 | 78 | 11 |
| BIOTYR 8 | 7.5 | 2 | 78 | 12.5 |

EXAMPLE 3

Comparative Study of the Adsorption of Clotting Factors onto the BIOTYR 1 and PROTEIN A—SEPHAROSE® RESINS 1) Standard protocol The characteristics of the purification device used are as follows:

Columns used: Bio Rad®) columns 4 cm in length, 0.7 cm in diameter, filled either with 1.7 ml of a suspension of 0.480 g of BIOTYR 1 resin as described in table I above, per ml of veronal buffer, or with 1 ml of a Protein A—Sepharose® gel at 0.270 g per ml of veronal buffer. The columns are equilibrated in veronal buffer, pH 7.36.

Flow rate: 0.1 ml/min in continuous closed circulation

Temperature: 37° C.

Plasma used: 6 ml of normal platelet-poor plasma (PPP) taken within the hour and placed in closed circulation in the device for 90 min. Several plasmas were examined for all the experiments carried out. Samples are taken at the following times:

T0: before contact with the resins,
T1: after 15 minutes of contact,
T2: after 30 minutes of contact,
T3: after 45 minutes of contact,
T4: after 60 minutes of contact,
T5: after 90 minutes of contact.

The same plasma was also maintained at 37° C. and left on the bench without being brought into contact with the resins and was sampled in the same way in order to serve as control (control 1).

The same plasma was then circulated, at 37° C., through a Bio Rad® column which did not contain resin and was sampled in the same way in order to determine the stability of the various factors studied in the system used (control 2).

This taking of samples made it possible to produce adsorption kinetics for the various factors studied.

2) Assaying the Plasmid Proteins 2.1) Measuring the Anti-FVIII Activity

The principle of this assay (Kasper et al., Thromb. Diath. Haemorr., 1975, 34, 869–872) is the measurement of the clotting activity of the residual FVIII after incubation of a mixture, at equal volume, of a pool of reference plasmas (RPs) containing 100% of all the clotting factors, including FVIII (sold by the company DADE-Behring, France), and of plasma to be tested, for 2 hours at 37° C.

If the abnormality of the plasma to be tested is caused by a deficient factor, it will be corrected in the presence of normal plasma. If the abnormality is secondary to the presence of an inhibitor, it will not be rectified by the presence of normal plasma. The level anti-FVIII antibodies is determined according to the principle of this assay. The anti-FVIII antibody titer is defined in Bethesda units (BU) per ml of plasma. 1 BU corresponds to the antibody concentration capable of inhibiting 50% of the factor VIII in 1 ml of healthy plasma, after 2 hours of incubation at 37° C.

2.2) Assaying Total IgGs

This assaying is carried out by radial immunodiffusion (RID) or by ELISA (Enzyme Linked Immunosorbent Assay).

2.2.1) Assaying by RID

The plasma to be tested is deposited into a well (5 μl) made in an agarose gel (NOR PARTIGEN® IgG HC plates, Behring) into which is incorporated a specific antiserum directed against the γ chain of human IgGs. According to conventional methodology, after 2 days of diffusion, the diameter of the precipitation rings is measured, to within 0.1 mm, using a graduated magnifying lens. The square of the precipitation ring diameter is proportional to the concentration of antigen (IgG to be assayed), and the result is expressed in mg/ml or in g/l.

2.2.2) Assaying by ELISA

According to the conventional ELISA protocol, microtitation plate wells are coupled with 100 pl of anti-human IgG antibodies at 5 μg/ml (SIGMA). After saturation with a fish gelatin solution, the IgGs to be assayed are incubated for 2 hours at room temperature. The IgGs to be assayed are revealed with biotinylated anti-IgGs (SIGMA), after 2 hours of incubation at ambient temperature. 100 μl of a Streptavidin-peroxydase (SIGMA) solution are then added for 15 minutes at 37° C.

The revelation is carried out with a tetramethylbenzidine clihydrochloride (TMB) substrate in the presence of hydrogen peroxide ($H_2O_2$). The reaction is stopped after 5 minutes, by adding 100 μl of a 2M sulfuric acid solution.

The optical density (O.D.) is read at 450 μm with an automatic plate reader. A standard range is established under the same conditions using a standard IgG solution (Bio-Rad). 2.3) Assaying clotting factors Clotting factors (FII, FV, FVII+X) and fibrinogen are conventionally assayed using chronometric or amidolytic assays by addition of a chromogenic substrate.

3) Results

3.1) Stability of Clotting Factors (FII, FV and FVII+X), of Fibrinogen and of Total IgGs Circulated at 37° C. Without Contact with the Resin Analysis of the results of controls 1 and 2 shows that the experimental conditions used do not induce any loss of activity of the various clotting factors studied, with the exception of factor V, for which a slight inactivation is observed, of the order of 20% after 90 min, which confirms the very high fragility of this factor.

3.2) Comparison of the Adsorption of Total IgGs on the BIOTYR 1 and Protein A—Sepharose® Resins The results are given in tables II and III below:

TABLE II

BIOTYR 1 resin

| Type of plasma | Time in min | % of IgG adsorbed | mg of IgG adsorbed/mg of resin | IgG (mg) remaining in the medium |
|---|---|---|---|---|
| Elution of 6 ml of PPP having an IgG level of 7.5 g/l | 0 | 0 | 0 | 45 |
| | 15 | 0 | 0 | 45 |
| | 30 | 0 | 0 | 45 |
| | 45 | 0 | 0 | 45 |
| | 60 | 0 | 0 | 45 |
| | 90 | 23.3 | 22 | 34.5 |
| Elution of 6 ml | 0 | 0 | 0 | 72 |

TABLE II-continued

BIOTYR 1 resin

| Type of plasma | Time in min | % of IgG adsorbed | mg of IgG adsorbed/mg of resin | IgG (mg) remaining in the medium |
|---|---|---|---|---|
| of PPP having an IgG level of 12 g/l | 15 | 0 | 0 | 72 |
| | 30 | 0 | 0 | 72 |
| | 45 | 0 | 0 | 72 |
| | 60 | 20.83 | 31.2 | 57 |
| | 90 | 20.8 | 31.2 | 57 |

TABLE III

Protein A - Sepharose ® resin

| Type of plasma | Time in min | % of IgG adsorbed | mg of IgG adsorbed/mg of resin | IgG (mg) remaining in the medium |
|---|---|---|---|---|
| Elution of 6 ml of PPP having an IgG level of 15.6 g/l | 0 | 0 | 0 | 93.7 |
| | 15 | 0 | 0 | 93.7 |
| | 30 | 20 | 69.3 | 75 |
| | 45 | 20 | 69.3 | 75 |
| | 60 | 38.4 | 133.3 | 57.7 |
| | 90 | 61.5 | 213.3 | 36.1 |
| Elution of 6 ml of PPP having an IgG level of 11.3 g/l | 0 | 0 | 0 | 67.9 |
| | 15 | 0 | 0 | 67.9 |
| | 30 | 0 | 0 | 67.9 |
| | 45 | 15 | 37.8 | 57.7 |
| | 60 | 38.2 | 96 | 42 |
| | 90 | 59.2 | 148.9 | 27.7 |

These results show that the percentages of IgG adsorbed onto the BIOTYR 1 resin are clearly lower than the percentages of IgG adsorbed onto the Protein A—Sepharose® resin, after 90 min of contact.

The resins of formula (I) in accordance with the invention therefore make it possible to adsorb much less circulating IgG than the resins of the Protein A—Sepharose® type of the prior art, thus clearly giving better preservation of the immune defenses of the patient in whom the plasmid purification is carried out.

3.3) Comparison of the Adsorption of Factors FII, FV and FVII+X, and of Fibrinogen onto the BIOTYR 1 and Protein A—Sepharose® Resins The results obtained after elution of 6 ml of PPP (various batches) are given in table IV below:

TABLE IV

| Time (min) | % FII adsorbed | | % FV adsorbed | | % FVII + X adsorbed | | % fibrinogen adsorbed | |
|---|---|---|---|---|---|---|---|---|
| | BIOTYR 1 | Protein A - Sepharose ® | BIOTYR 1 | Protein A - Sepharose ® | BIOTYR 1 | Proteine A - Sepharose ® | BIOTYR 1 | Protein A - Sepharose ® |
| 0 | 0 | 0 | 0 | 0 | 0 | 4.8 | 0 | 0 |
| 15 | 8 | 2.1 | 0 | 1.5 | 0 | 0 | 0.7 | 4.6 |
| 30 | 10 | 2.4 | 2.8 | 7.7 | 0 | 7.9 | 0.8 | 5.8 |
| 45 | 7.1 | 4.5 | 1.9 | 0 | 0.9 | 11.9 | 0 | 6.1 |
| 60 | 8.1 | 0 | 3.8 | 0.1 | 3.9 | 4.0 | 0.1 | 0 |
| 90 | 2.0 | 3.3 | 0 | 0.3 | 0.9 | 2.4 | 0.9 | 11.9 |
| 0 | 0 | 0 | 0 | 0 | 0 | 0 | 0 | 0 |
| 15 | 0 | 9.1 | 3.8 | 6.4 | 0 | 0 | 8 | 3.2 |
| 30 | 0 | 9.6 | 5.4 | 11.5 | 0 | 2.9 | 1.1 | 0 |
| 45 | 0 | 13.7 | 3.6 | 9 | 0 | 0 | 10.2 | 11.4 |

TABLE IV-continued

| | % FII adsorbed | | % FV adsorbed | | % FVII + X adsorbed | | % fibrinogen adsorbed | |
|---|---|---|---|---|---|---|---|---|
| Time (min) | BIOTYR 1 | Protein A - Sepharose ® | BIOTYR 1 | Protein A - Sepharose ® | BIOTYR 1 | Proteine A - Sepharose ® | BIOTYR 1 | Protein A - Sepharose ® |
| 60 | 5.6 | 11.2 | 7.2 | 9 | 4.2 | 2.9 | 3.2 | 6.6 |
| 90 | 1.8 | 1.8 | 14.4 | 0 | 3.1 | 4.7 | 6.8 | 9.8 |

These results show that the adsorption of these various clotting factors is very low on the two types of resin, even in the case of factor V, for which the inactivation is no higher than that noted with controls 1 and 2.

EXAMPLE 4

Demonstration of the Specificity Of Adsorption of a Resin of Formula (I) with Respect to Anti-FVIII Antibodies 1) Plasma Purification Device The experimental conditions selected for this study are close to those used during therapeutic purifications. The characteristics of the device used are as follows::
  Column used: Bio Rad®) column 4 cm in height, 1 cm in diameter, filled with 4 ml of a suspension of 0.480 g of BIOTYR 4 resin as prepared in example 1 above, per ml of veronal buffer. The column is equilibrated in veronal buffer, pH 7.36.
  Flow rate: 1 ml/min in continuous closed circulation
  Temperature: 37° C.
  Plasma used: 8 ml of platelet-poor plasma (PPP) from an individual suffering from severe hemophilia A, containing anti-FVIII antibodies (SHA I+) with a titer equal to 1 000 BU/ml.
  Samples were taken at the following times:
  T0: before contact with the resins,
  T1: after 30 minutes of contact,
  T2: after 60 minutes of contact,
  T3: after 90 minutes of contact.
  Three series of experiments are carried out:
  Adsorption of anti-FVIII antibodies onto a column for 90 min,
  Adsorption of anti-FVIII antibodies onto a first column for 90 min, and then onto a second column, assembled in parallel, for a further 90 min,
  Same experiment as that described above (2 columns assembled in parallel). 2 cycles are carried out on each of the columns after successive regeneration of the column not used using 25 ml of citric acid at pH 2.2, and reconditioning of the column before it is reused.

2) Results

The results are given in tables V, VI and VII below.

Table V gives the results obtained after passing 8 ml of SHA plasmas over a column filled with BIOTYR 4 resin for 90 min.

Table VI gives the results obtained after passing 8 ml of an SHA I+ plasma over 2 columns as described above.

Table VII gives the results obtained after regeneration of the columns according to the method described above, 20 ml of an SHA I+ plasma (1 000 BU/ml) being purified on the two columns.

TABLE V

| Time in min | Anti-FVIII antibodies adsorbed (in BU) | Anti-FVIII antibodies adsorbed (in BU/g of resin) | % of anti-FVIII antibodies adsorbed |
|---|---|---|---|
| 0 | 0 | 0 | 0 |
| 30 | 920 | 479.2 | 11.5 |
| 60 | 1600 | 833.3 | 20 |
| 90 | 3360 | 1750 | 42 |

These results show that 42% of the anti-FVIII antibodies are retained on the column.

TABLE VI

| Columns | Time (min)[a] | Anti-FVIII antibodies remaining in the medium (in BU) | % of anti-FVIII antibodies adsorbed (cumulative yield) | Anti-FVIII antibodies adsorbed (in BU/g of resin)[b] | Anti-FVIII antibodies absorbed (in BU)[c] |
|---|---|---|---|---|---|
| 1st column | 0 | 8 000 | 0 | 0 | 0 |
| | 30 | 6 400 | 20 | 833 | 1 600 |
| | 60 | 6 280 | 21.5 | 896 | 1 720 |
| | 90 | 5 480 | 31.5 | 1 313 | 2 520 |
| 2nd column | 120 | 4 800 | 40 | 354 | 3 200 |
| | 150 | 4 640 | 42 | 438 | 3 360 |
| | 180 | 3 392 | 57.6 | 1 088 | 4 608 |

[a]total time of the simulated purification
[b]capacity of adsorption of each column
[c]Anti-FVIII total antibodies adsorbed These results show that approximately 60% of the anti-FVIII antibodies are retained after successive passage over the two columns. Each column has an equivalent capacity of adsorption, of the order of 1 312 and 1 087 BU/g of dry resin, after 90 min of contact with the plasma.

TABLE VII

| | Time (min) | | | | |
|---|---|---|---|---|---|
| | 0 | 60 (column 1) | 120 (column 2) | 180[d] (column 1) | 240[d] (column 2) |
| Anti-FVIII antibodies adsorbed (in BU/g of resin) | 0 | 4 427 | 2 297 | 776 | 938 |
| Anti-FVIII antibodies adsorbed (in BU) | 0 | 8 500 | 4 411 | 1 489 | 1 800 |
| Initial anti-FVIII antibodies in the medium (in BU) | 20 000 | 20 000 | 11 500 | 7 089 | 5 600 |

TABLE VII-continued

| | Time (min) | | | | |
|---|---|---|---|---|---|
| | 0 | 60 (column 1) | 120 (column 2) | 180[d] (column 1) | 240[d] (column 2) |
| Anti-FVIII antibodies remaining in the medium (in BU) | 20 000 | 11 500 | 7 089 | 5 600 | 3 800 |
| % of anti-FVIII antibodies adsorbed (cumulative yield) | 0 | 42.5 | 64.6 | 72 | 81 |
| Yield from each step (in % adsorbed) | 0 | 42.5 | 38.4 | 21 | 32.1 |

[d]passivated resin since already regenerated.

These results show that, after the plasma has been passed over the first column for 60 minutes, approximately 42% of the anti-FVIII antibodies are retained. During the regeneration of column 1, the plasma is purified on column 2 and approximately 64% of total anti-FVIII antibodies are retained. The passing of the plasma over the regenerated column 1 leads to 72% retention of the anti-FVIII antibodies. Finally, a last passage over the regenerated column 2 results in depletion of approximately 80% of anti-FVIII antibodies from the plasma.

EXAMPLE 5

Study of the Adsorption of a Complement Protein by the BIOTYR 1 Resin

The study was chosen to relate to the C3 protein, one of the early and central components of the complement system. It is a soluble protein with a high normal serum concentration, of the order of 1.0 to 1.3 g/l. One of the consequences of activation of C3 is its conversion to $C3_c$. This activation may be carried out by recalcifying the serum or the plasma and adding inulin, which is an activator which gives rise to the formation of $C3_c$.

1) Plasma Used 6 ml of a normal PPP are circulated over a purification column containing 1 ml of a suspension of 0.48 g of BIOTYR 1 resin.

The $C3_c$ protein was assayed indirectly on samples taken at the following times:

T0: PPP before passage over the column,
T1: PPP after 15 min of contact with BIOTYR 1,
T2: PPP after 30 min of contact with BIOTYR 1,
T3: PPP after 45 min of contact with BIOTYR 1,
T4: PPP after 60 min of contact with BIOTYR 1, a serological sample from the same donor was prepared and assayed for $C3_c$ (controls S, without passage over the purification column).

2) Assaying the C3 Protein

This assay was carried out indirectly, i.e. after activation of the C3 protein to $C3_c$ by the action of inulin. Activation by inulin requires preincubation of the sample to be tested for 5 hours at 37° C. in the presence of inulin in a proportion of 2 g/l of plasma.

The $C3_c$ protein is then assayed conventionally on serum by RID, the technique described above for assaying total IgGs, using a specific antiserum directed against the $C3_c$ protein, on NOR-PARTIGEN® plates.

3) Results

The results obtained appear in table VIII below. Each result is the mean of two determinations.

TABLE VIII

| Sample | Concentration of $C3_c$ (g/l) | Adsorption of C3 (%) |
|---|---|---|
| Control S | 1.2 | — |
| T0 | 1.2 | 0 |
| T1 | 1.2 | 0 |
| T2 | 1.0 | 18.7 |
| T3 | 1.0 | 18.7 |
| T4 | 1.0 | 18.7 |

These results show that the concentration of the $C3_c$ protein is the same in the serum and in the plasma T0 (1.2 g/l). They also show that the concentration of $C3_c$ proteins decreases from 1.2 g/l to 1.0 g/l after 30 min of contact with the BIOTYR 1 resin, and then remains constant. After 60 minutes of contact of a healthy plasma on the BIOTYR 1 resin, there is therefore little decomplementation of this plasma.

The same experiment carried out on an SHA I+ plasma, after 180 minutes of contact with the BIOTYR 4 resin, demonstrates, here again, a weak decomplementation of the plasma of the hemophiliac, i.e. of the order of 12%.

These degrees of decomplementation are not prejudicial to the patient.

In conclusion, this entire set of results shows that the resins of formula (I) in accordance with the invention make it possible to very effectively remove the anti-FVIII antibodies from plasmas of hemophiliacs having high levels of anti-FVIII antibodies, without observing any prejudicial decomplementation and without depriving the plasma treated of a significant amount of IgG.

The invention claimed is:

1. A resin made of polystyrene crosslinked at 2–5% and functionalized with sulfonate groups and sulfamide groups derived from the methyl ester of L-tyrosine, characterized in that it corresponds to the following formula (I):

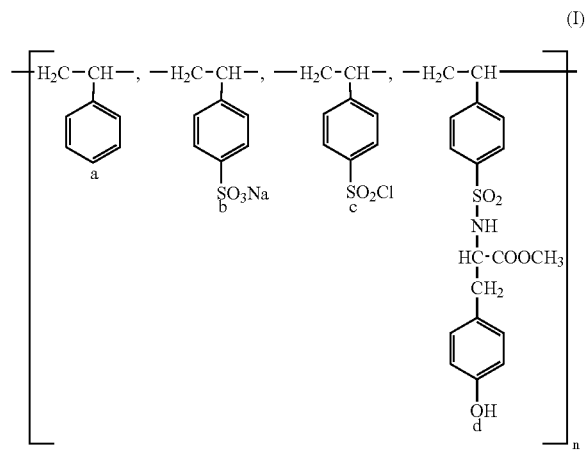

in which:
- a is between 5 and 15%;
- b is between 74 and 82%;
- c is between 0 and 5%; and
- d is between 5 and 15%;
- n is between 3 and 5 000;
- the sum of a+b+c+d being equal to 100.

2. The resin as claimed in claim 1, in which the index c is equal to 0%.

3. The resin as claimed in claim 1, in which the index d is between 7 and 13%.

4. The resin as claimed in claim 1, characterized in that the polystyrene is crosslinked with divinylbenzene.

5. The resin as claimed in claim 1, characterized in that it is in the form of beads with a diameter of between 35 and 80 µm in the dry state.

6. The resin as claimed in claim 5, characterized in that it is in the form of beads with a diameter of between 35 and 75 µm in the dry state.

7. A method for producing columns for purifying plasma and blood which comprises placing into a purification column at least one resin of formula (I) as defined in claim 1.

8. The method use as claimed in claim 7, characterized in that the columns are capable of adsorbing anti-FVIII antibodies.

9. The method as claimed in claim 7, characterized in that the columns are intended to treat liquids containing anti-FVIII antibodies.

10. The method as claimed in claim 9, characterized in that said liquids are plasmas or total blood from patients suffering from hemophilia A.

11. A purification column containing at least one resin of formula (I) as defined in claim 1, equilibrated in buffer at a physiological pH.

12. A device for purifying anti-VIII antibodies, consisting of a closed circuit with continuous circulation, comprising one or more purification columns as defined in claim 11.

13. The device as claimed in claim 12, characterized in that it comprises at least two columns arranged in series or in parallel.

14. A method for preparing resins made of functionalized polystyrene of formula (I) as defined in claim 1, characterized in that, in a first step, a chlorosulfonation reaction is carried out, comprising reacting monochlorosulfonic acid ($HSO_3Cl$) on beads of nonfunctionalized polystyrene (PS) crosslinked at 2–5%, in an $HSO_3Cl$/PS molar ratio of greater than 8, so as to obtain a polystyrene carrying parachlorosulfonic functions ($PSSO_2Cl$), and then, a second step comprising esterifying the para-chlorosulfonic functions ($SO_2Cl$) of the polystyrene $PSSO_2Cl$ thus obtained, with the methyl ester of L-tyrosine (TyrOMe) in the form of hydrochloride dissolved beforehand in an organic solvent medium in the presence of a tertiary amine, the TyrOMe/$SO_2Cl$ molar ratio (R) being between 0.1 and 1, the tertiary amine/TyrOMe molar ratio (R') being between 1 and 2 and the tertiary amine/$SO_2Cl$ molar ratio (R") being between 1 and 2, so as to obtain a resin of formula (I).

15. The method as claimed in claim 14, characterized in that the molar ratio (R) is equal to 0.15, the molar ratio (R') is equal to 2, and the molar ratio (R") is equal to 1.

16. The method as claimed in claim 14, characterized in that the beads of crosslinked nonfunctionalized polystyrene used in the first step are beads of polystyrene crosslinked with divinylbenzene.

17. The method as claimed in claim 14, characterized in that the chlorosulfonation reaction is carried out at a temperature of between 30 and 60° C.

18. The method as claimed in claim 14, characterized in that, when the synthesis has finished, the resin of formula (I) is washed with a basifying agent capable of hydrolyzing the residual para-chlorosulfonyl functions without saponifying the L-tyrosine methyl ester functions.

19. A method for purifying the anti-FVIII antibodies present in a liquid, ex vivo, characterized in that it comprises:
- a) bringing said liquid into contact with at least one purification column containing at least one resin of formula (I) as defined in claim 1, and
- b) then separating said liquid from said resin of formula (I) onto which the anti-FVIII antibodies have been absorbed.

20. The purification method as claimed in claim 19, characterized in that said liquid is blood plasma or total blood.

21. The purification method as claimed in claim 20, characterized in that the blood plasma or the total blood are, respectively, blood plasma or total blood from patients suffering from hemophilia A.

* * * * *